United States Patent [19]

Newstead

[11] 3,966,025

[45] June 29, 1976

[54] HYDRAULICALLY OPERATED DISC BRAKES FOR VEHICLES

[75] Inventor: Charles Newstead, Walsall, England

[73] Assignee: Girling Limited, Birmingham, England

[22] Filed: Mar. 18, 1975

[21] Appl. No.: 559,591

Related U.S. Application Data

[63] Continuation of Ser. No. 464,222, April 25, 1974, abandoned, which is a continuation of Ser. No. 170,254, Aug. 9, 1971, abandoned.

[30] Foreign Application Priority Data

Aug. 21, 1970 United Kingdom............... 40275/70

[52] U.S. Cl.................................. 188/72.5; 92/172
[51] Int. Cl.²......................................... F16D 55/228
[58] Field of Search................. 188/72.4, 72.5, 72.6, 188/370; 92/172, 128

[56] References Cited

UNITED STATES PATENTS

| | | | |
|---|---|---|---|
| 1,180,777 | 4/1916 | Lemp | 92/172 |
| 2,214,762 | 9/1940 | Eksergian | 188/72.5 |
| 2,273,345 | 2/1942 | Burrell | 188/72.4 |
| 2,541,032 | 2/1951 | Butler | 188/72.4 |
| 2,672,223 | 3/1954 | Butler | 188/72.4 |
| 2,835,350 | 5/1958 | Butler | 188/72.4 |

FOREIGN PATENTS OR APPLICATIONS 202,243 8/1923 United Kingdom............... 92/172

*Primary Examiner*—Trygve M. Blix
*Assistant Examiner*—Edward R. Kazenske
*Attorney, Agent, or Firm*—Imirie, Smiley & Linn

[57] ABSTRACT

A disc brake comprises a fluid pressure-operated actuator for urging two pressure plates carrying friction pads to opposite faces of a disc. In the actuator a piston movable in a housing is detachably engaged with a draw-bar which acts on one of the pressure plates, the housing acting directly on the second pressure plate. A seal between the housing and the draw-bar contacts an enlarged portion of the draw-bar. A screw-driver slot is provided to prevent the draw-bar from rotating.

6 Claims, 5 Drawing Figures

HYDRAULICALLY OPERATED DISC BRAKES FOR VEHICLES

This is a continuation of application Ser. No. 464,222 filed Apr. 25, 1974, and now abandoned, which was a continuation of application Ser. No. 170,254 filed Aug. 9, 1971, and now abandoned.

This invention relates to improvements in fluid pressure-operated disc brakes of the kind in which pressure plates for applying friction pads to opposite faces of a rotatable disc are urged towards each other in the application of the brake by at least one fluid pressure-operated actuator comprising a wall movable in a housing and acting on one pressure plate through a drawbar which extends axially through a closed end of the housing and over the peripheral edge of the disc to apply a friction pad to one face of the disc, the other friction pad being applied to the opposite face of the disc by the housing which acts directly on the other pressure plate.

When a disc brake of the kind set forth is installed in a vehicle in which there is a space on the inboard side of the disc opposite to the wheel it is preferable for the actuator to be located in that space since the fluid pressure medium and seals between the piston and the housing are constantly exposed to a cooling draught when the vehicle is in motion. This has the advantage that the life of the seals is increased and problems associated with expansion and or vapourisation of the fluid pressure medium at high temperatures are reduced or substantially eliminated.

In such installation it is desirable to provide a detachable engagement between the movable wall and the draw bar to enable the movable wall to be withdrawn from the open-inboard end of the housing in order to inspect and replace the seals without first having to remove the wheel.

In one known form of brake of the kind set forth, in which the actuator comprises an hydraulic actuator in the form of a piston and cylinder assembly located in a space on the inboard side of the disc opposite to the wheel, the draw-bar is of a constant diameter throughout its axial length and has a detachable screw-threaded engagement with the piston over its full diameter. Thus, in assembling the brake, the screw-threaded end portion must be inserted in the cylinder housing through an hydraulic seal in the closed end of the housing to effect the screw-threaded engagement with the piston. This is undesirable since, during assembly, the screw-threads on the draw-bar may cut or otherwise damage that seal.

According to our invention, in a fluid pressure-operated disc brake of the kind set forth the draw-bar has a portion of enlarged diameter which terminates in a shoulder towards the inner end of the draw-bar, the inner end portion of the draw-bar being screw-threaded at least at its distal end, and the inner end portion of the draw-bar is received in a longitudinally extending bore in the movable wall, the movable wall being counter-bored from the end adjacent the closed end of the housing to receive the enlarged portion of the draw-bar, the shoulder engaging with the step in diameter in the movable wall, a first seal between the enlarged portion of the draw-bar and the closed end of the housing being located in the wall of the housing.

Sealing the draw-bar to the housing over a portion of enlarged diameter ensures that, when the brake is assembled, the screw-threads do not contact the first seal.

Where a second seal is provided between the enlarged portion of the draw-bar and the movable wall and the second seal is located in the wall of the counterbore, when the movable wall is to be detached from the draw-bar and withdrawn from the open outer end of the housing, the screw-threads can not contact the second seal.

Means are incorporated for preventing rotation of the draw-bar when the movable wall is mounted on or withdrawn from the draw-bar.

Our invention is particularly applicable to brakes of the kind set forth in which the pressure members are chordal with respect to the disc and are urged towards each other in the application of the brake by a pair of circumferentially spaced hydraulic actuators each comprising a piston working in a cylindrical housing and acting between complementary end portions of the pressure plates which extend outwardly beyond the peripheral edge of the disc, and the draw-bars project through openings in a stationary drag-taking member in which the friction pads are guided.

According to another aspect of our invention in a fluid pressure-operated disc brake of the kind set forth the draw-bar is detachably engaged with the movable wall and means are incorporated for preventing rotation of the draw-bar. The draw-bar may be keyed to a non-rotatable part of the brake or alternatively the means may be adapted for co-operation with a hand tool.

A disc brake assembly incorporating a disc brake in accordance with our invention, and a modified actuator are illustrated in the accompanying drawings in which.

Figure 1:
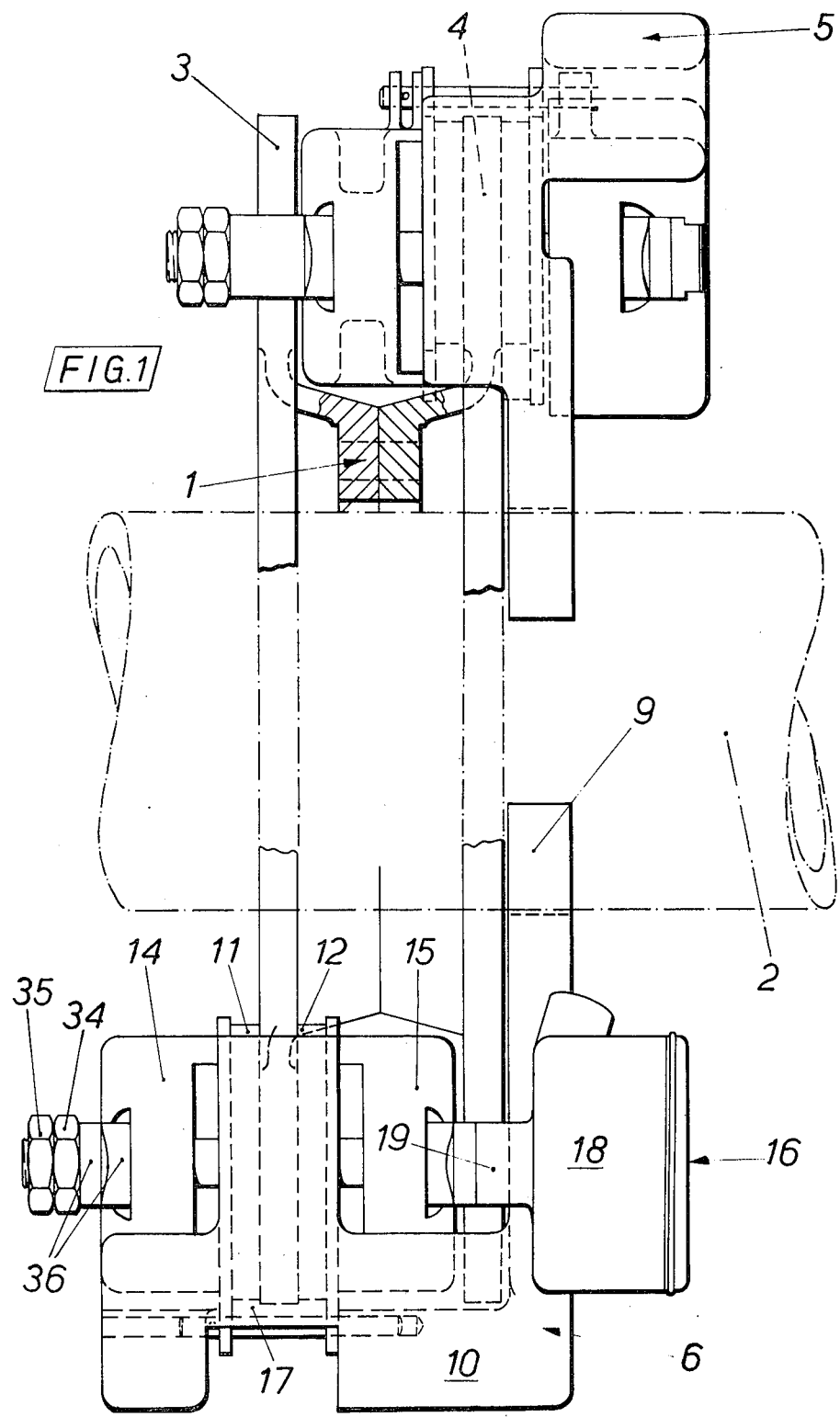
FIG. 1 is a side view of the brake including a part section through a rotatable disc assembly.
Figure 2:
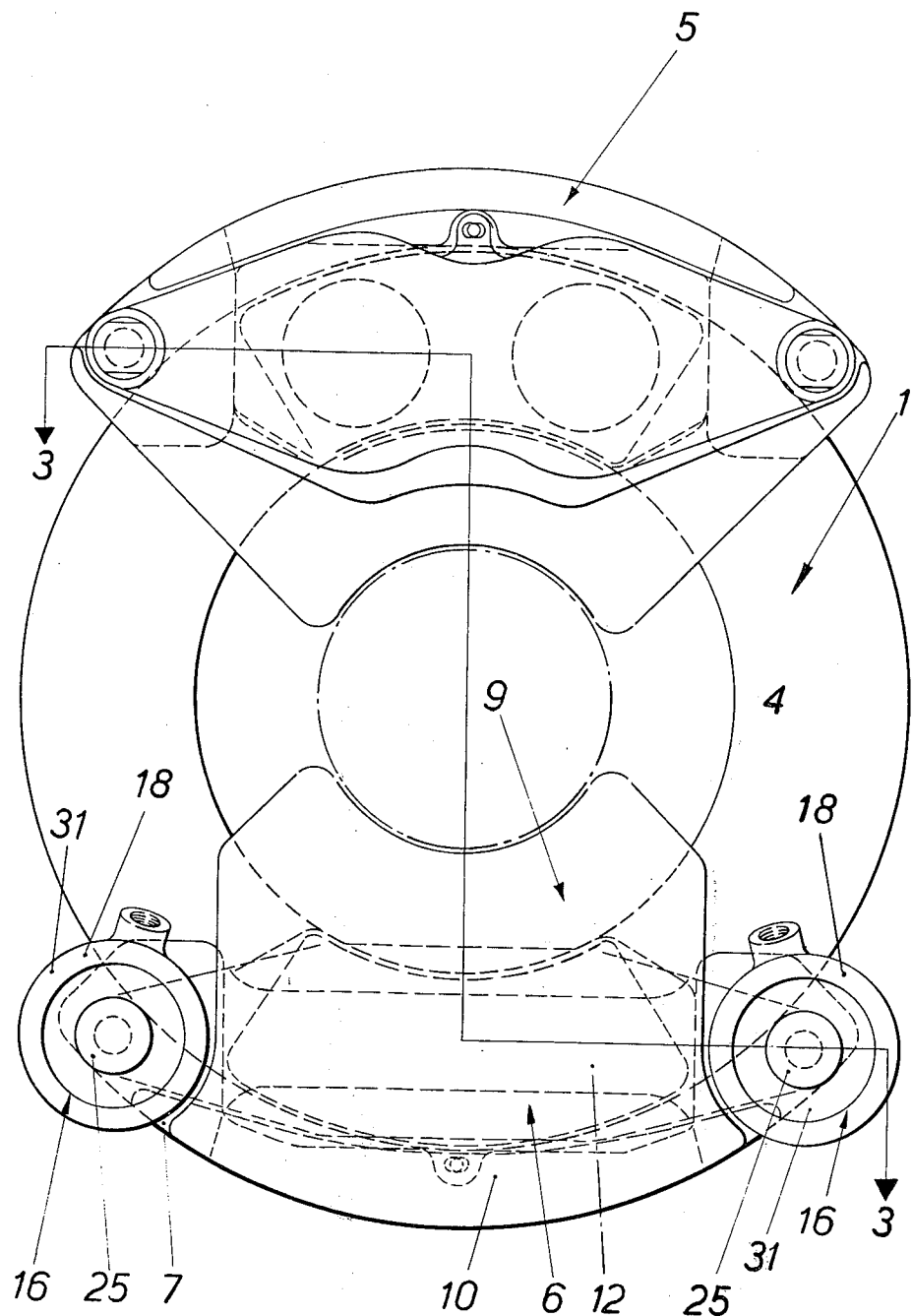
FIG. 2 is a front view of the inboard side of the brake illustrated in FIG. 1 on the axis of the brake.
Figure 3:
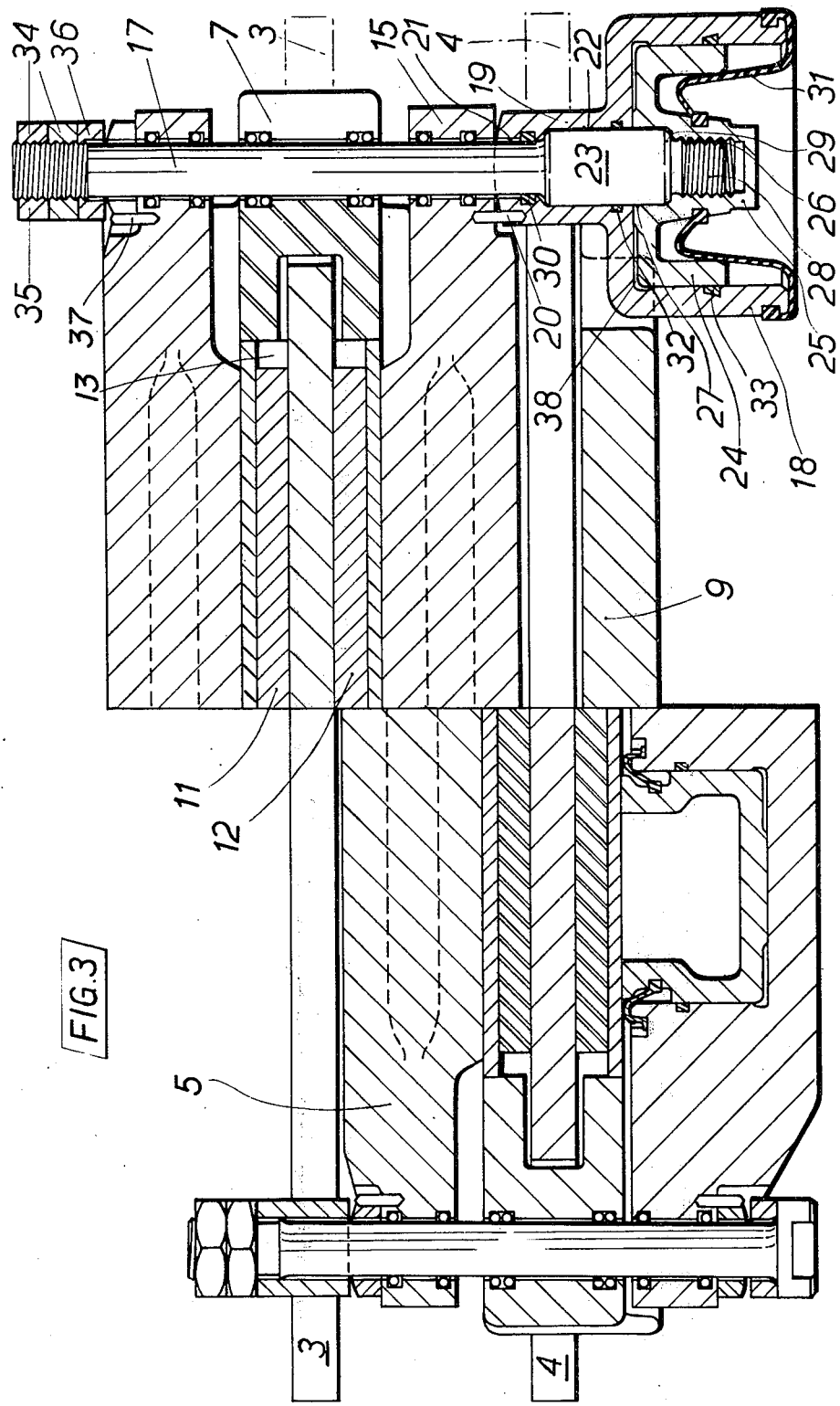
FIG. 3 is a section on the line 3—3 of FIG. 2.

In the disc brake assembly illustrated in FIGS. 1 to 4, 1 is a rotatable disc assembly for rotation with an axle 2 and comprising a pair of identical dish-shaped discs which are bolted together in back-to-back relationship to define a pair of axially spaced annular braking flanges 3 and 4.

The disc brake assembly includes two diametrically opposed disc brakes 5 and 6 each applying a braking force to a different braking flange.

The disc brake 6 for applying a braking force to the outboard flange 3 comprises a stationary drag-taking member 7 of arcuate outline and substantially U section which straddles a portion of the periphery of that flange 3. The drag-taking member 7 is carried from the outer end of an inwardly extending support 9 secured to a stationary part adjacent to the inboard flange 4 by means of an axial extension 10 lying outside the peripheral edge of the flange 4.

Friction pad assemblies 11, 12 for engagement with opposite faces of the outboard flange 3 are guided for movement towards and away from the flange 3 in a suitable opening in the drag-taking member 7 which is of substantial circumferential length and which is open at its radially outermost end to permit the insertion into and removal from, the brake, of the friction pad assemblies 11, 12. Each friction pad assembly comprises a friction pad of segmental outline carried by a rigid backing plate and, in the application of the brake, the drag on the friction pad assemblies is taken by the end walls of the opening 13 in the drag-taking member 7.

The friction pad assemblies 11, 12 are applied to opposite faces of the flange 3 in the application of the brake by a pair of pressure plates 14, 15 which are chordal with respect to the flange 3 and are located on opposite sides of the drag-taking member 7. The inboard pressure plate 15 is located between the flange 3 and 4. The outer ends of the pressure plates 14, 15, which lie outside the peripheral edges of the flanges 3 and 4, are connected by a pair of hydraulic actuators 16 in accordance with our invention.

Each hydraulic actuator 16 comprises an axially extending draw-bar 17 which extends through aligned openings in the pressure plates 14 and 15 and the drag-taking member 7.

An open-ended cylindrical housing 18 is provided with an axial extension 19 in abutment at its innermost end with the pressure plate 15 and the housing 18 is keyed to the pressure plate 15 against rotation by a spigot location 20. The axial extension 19 is provided with a longitudinal bore 21 through which the draw-bar is inserted, and the bore 21 is counterbored at 22 from its outermost end to receive a portion 23 of enlarged diameter on the draw-bar 17.

The portion 23 extends into the bore of the housing in which works a cup-shaped hydraulic piston 24 having an outwardly extending central boss 25. The boss 25 is bored at 26 for substantially the whole of its axial length and is counterbored at its open end at 27 to receive the outer end of the portion 23. The bore 26 is screw-threaded internally to receive a screw-threaded portion 28 of reduced diameter leading from the portion 23 and terminating at the free end of the draw-bar 17. The outer end of the portion 23 abuts against a shoulder 29 at the change in diameter between the bore 26 and the counterbore 27.

An annular sealing ring 30 is located in a recess in the wall of the bore 21 of the extension 19 to form a seal with the portion of the draw-bar outwardly of the enlarged portion 23, and a flexible diaphragm or other resilient boot 31 is fitted between the wall or the cylinder housing 18 and the boss 25 to prevent the ingress of foreign matter into the bore of the housing 18. A static seal 32 is housed in an annular recess in the wall of the housing to form a seal with the enlarged portion 23 of the draw-bar 17, and the piston 24 works through an annular seal 33 in the internal wall of the cylindrical housing 18.

The end of the draw-bar 17 remote from the piston 24 projects from the pressure plate 14 and is screw-threaded to receive a nut 34 and a locking nut 35 which serve to retain the extension 19 of the housing 18 in abutment with the pressure plate 15, and hold a pair of thrust washers 36 located between the nut 34 and the pressure plate 14, in engagement. The innermost thrust washer 36 is keyed to the pressure plate 14 against rotation by means of a spigot 37.

In the application of the brake hydraulic fluid pressure is applied simultaneously to annular spaces 38 between the piston 24 and cylinder housing 18 of each hydraulic actuator. This causes the housing 18 and the piston 24 to move in opposite directions away from each other with the result the friction pad assembly 12 is applied directly to the disc by the engagement with the pressure plate 15 of the cylinder housing 18. The other friction pad assembly 11 is applied directly to the opposite face of the disc through the pressure plate 14 due to the action of the piston 24 urging the draw-bar 19 in the opposite direction.

To remove the piston 24 for replacement of a seal 33 in the wall of the cylinder bore, the boot 31 is removed and the piston 24 unscrewed from its engagement with the draw-bar 17. This permits the piston to be withdrawn from the outer end of the cylindrical housing 18 on the inboard side of the disc assembly 3. The drawbar 17 may be keyed to one of the pressure plates against rotation with respect to the housing 18.

The disc brake 5 is conveniently of the construction forming the subject of our United Kingdom Pat. Specification No. 1,193,641 and need not be described further herein.

Figure 5:
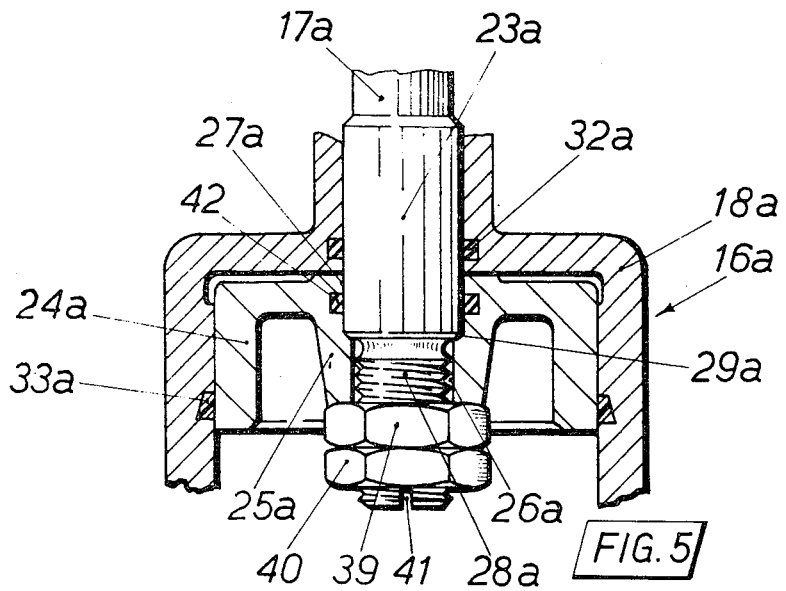
FIG. 5 is a longitudinal section through a modified hydraulic actuator for use in the brake of FIGS. 1 to 3.
Figure 4:
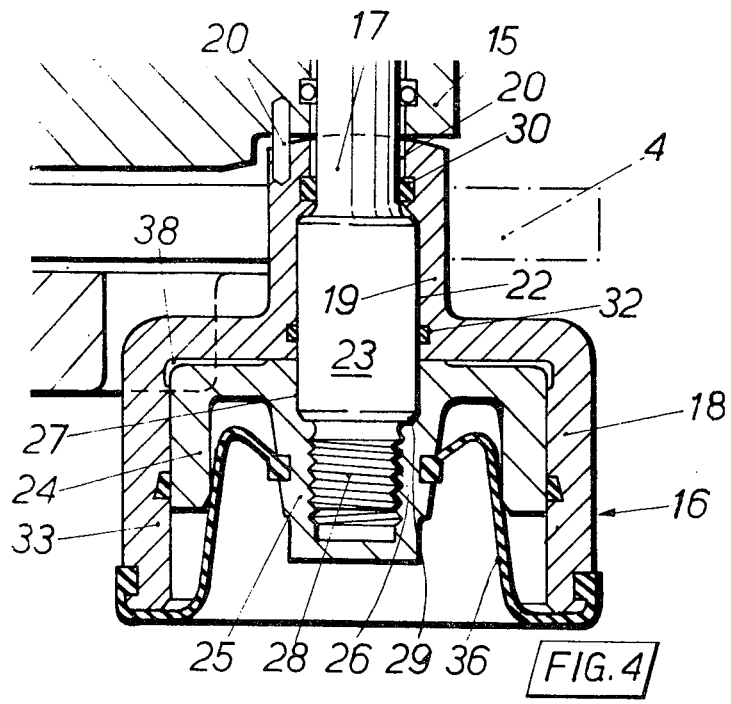
FIG. 4 is a section on an enlarged scale of a portion of the brake illustrated including the hydraulic actuator shown in FIG. 3.

In the modified hydraulic actuator illustrated in FIG. 5 corresponding reference numerals qualified by the suffix $a$ have where appropriate, been applied to corresponding parts. In that embodiment the bore 26$a$ in the piston 24$a$ is plain and extends to the free end of the boss 25$a$. The screw-threaded portion 28$a$ at the free end of the draw-bar 17$a$ is increased in length to project from the boss 25$a$ when the outer end of the portion 23$a$ of the draw-bar 17$a$ is in abutment with the shoulder 29$a$. A nut 39 and a lock-nut 40 are screwed onto the threaded portion 28$a$ at the free end of the draw-bar 17$a$ which projects from the piston 24$a$ to prevent relative movement between the piston 24$a$ and the draw-bar 17$a$ taking place in an axial direction.

The free end of the threaded portion 28$a$ of the draw-bar 17$a$ which projects from the boss 25$a$ is provided with a slot 41 to receive the blade of a tool, for example a screw-driver, by means of which the draw-bar 17$a$ can be held against rotation when the nuts 39 and 40 are unscrewed therefrom. Thereafter the piston 24$a$ can be slid off the draw-bar 17$a$.

In the embodiment of FIG. 5 a stationary annular seal 42 located in the wall of the counter-bore 27$a$ in the piston 24$a$ provides a seal with the portion 23$a$ of the draw-bar. Alternatively a seal could be inserted between the interface of shoulder 29$a$ and the complementary outer end of the portion 23$a$.

When the piston 24$a$ is withdrawn from the cylinder housing 18$a$ there is no danger of the screw-threads at the free end of the draw-bar 17$a$ contacting the seal 42 as these screw-threads are provided on a portion of the draw-bar 17$a$ which is of smaller diameter than that of the enlarged portion 23$a$.

In a modification each hydraulic actuator may be replaced by a booster of the vacuum or air suspended type comprising a movable wall in the form of a piston or diaphragm assembly located within a housing to define in the housing separate chambers of constant and variable pneumatic pressures respectively. When a pressure differential is established across the movable walls, the walls move axially in the housings to urge the pressure plates 14 and 15 towards each other by the application of a force to the pressure plate 14 through the draw-bars 17, 17$a$ and by the direct engagement of the housing with the pressure plate 15.

In a further embodiment, not illustrated, the hydraulic actuators 16 are supported against excessive movement in all but the axial directions by a plannar actuator support member which is located between the hydraulic actuators 16 and attached to the hydraulic actuators 16. The actuator support member is floatingly mounted, for example by way of rubber O-rings housed in an annular recess in each of a pair of through bores in the actuator support member, the internal diameter of the O-rings being less than the through bore diameter, on a pair of pins which are rigidly attached to and protrude axially from the inwardly extending brake support member 9. The hydraulic actuators 16 are thus free to move axially as the friction pads wear, carrying the actuator support member with them as they do so, but restrained from excessive movement in any other direction by the connection of the actuator support member to the brake support member by way of the pins.

In a modification each hydraulic actuator 16 may be supported by a separate actuator support member mounted in the manner previously described, to the brake support member 1.

In a further modification the mounting pins are provided on the actuator support member. The floating mounting for the pins being formed in holes provided in the brake support member 9.

In yet a further modification the actuator support is restrained against axial movement and the hydraulic actuators are slidingly supported on the actuator support member.

I claim:

1. An hydraulically operated disc brake comprising a rotatable disc, two pressure plates for applying respective friction pads to opposite faces of the disc and at least one hydraulically-operated actuator for urging the pressure plates towards each other on application of the brake, said actuator comprising a cylinder housing having an open outer end, an end wall of the housing acting on one of the pressure plates and having a bore, a piston movable in the housing and having a stepped bore comprising a first bore portion of smaller diameter located adjacent to said open outer end, a second bore portion of larger diameter located adjacent to said end wall, and a step between said first bore portion and said second bore portion, a draw bar detachably connected to the piston and extending through said bore in said housing and over the peripheral edge of the disc to act on the second pressure plate, said draw-bar having a screw-threaded, reduced diameter end first portion having a free end, a second portion of a diameter larger than and continuous with said first portion, and a shoulder between said first portion and said second portion, at least part of said second portion of said draw bar being firmly accommodated within said second bore portion of said stepped bore over a contact area such that said shoulder engages said step in said bore, a first seal between said second portion of said draw bar and said housing disposed within said contact area, a second seal between said second portion of said draw bar and said second bore portion of said stepped bore in the piston, at least one nut screwed onto said first portion of the draw bar which projects through said piston and which is accessible through said open end of said housing, said nut clamping said shoulder and said step together, and positive locating means on said free end of said draw bar for engagement with a tool to enable said draw bar to be held against rotation at least when said nut is being tightened and untightened.

2. An hydraulically operated disc brake as in claim 1 wherein the pressure plates are chordal with respect to the disc and are urged towards each other in the application of the brake by a pair of said hydraulically operated actuators acting between complementary end portions of the pressure plates which extend outwardly beyond the peripheral edge of the disc, and the draw bar of each actuator projects through openings in a stationary drag-taking member in which the friction pads are guided.

3. An hydraulically operated disc brake as in claim 1 wherein said cylinder housing, said piston and said draw bar comprise a subassembly removably carried on said pressure plates.

4. An hydraulically operated disc brake as in claim 3 further including means cooperating with said housing to preclude rotation thereof with respect to said pressure plates.

5. An hydraulically operated disc brake as in claim 1 wherein said positive locating means comprises a screwdriver slot in the inner end of said draw bar.

6. A disc brake assembly for a vehicle including a first rotatable disc, a second rotatable disc rotatable with and spaced axially from said first disc, each disc having an inner face and an outer face, said inner face of said first disc facing said inner face of said second disc and said outer face of each disc facing outwardly away from the other disc, a first pair of friction pads for engagement with said inner and said outer faces of said first disc, a second pair of friction pads for engagement with said inner and said outer faces of said second disc, first and second fluid-pressure operated actuating means for applying said first and second pairs of friction pads to said inner and outer faces of each respective said first and said second disc, said first and second actuating means being both located adjacent to said outer face of said second disc, a first pair of inner and outer axially movable pressure plates for urging said first pair of friction pads into engagement with said inner and outer faces of said first disc, a second pair of inner and outer axially movable pressure plates for urging said second pair of friction pads into engagement with said inner and outer faces of said second disc, wherein said first actuating means comprises a pair of circumferentially spaced actuators and at least one of said actuators comprises a cylinder housing having an open outer end and a part extending over said second disc, an end wall of the housing acting on said inner pressure plate of said first pair of pressure plates and having a bore, a piston movable in the housing and having a stepped bore comprising a first bore portion of smaller diameter located adjacent to said open outer end, a second bore portion of larger diameter located adjacent to said end wall, and a step between said first bore portion and said second bore portion, a draw-bar detachably connected to the piston and extending through said bore in said housing and over the peripheral edge of said first disc to act on said outer pressure plate of said first pair, said draw-bar having a screw-threaded, reduced diameter end first portion having a free end, a second portion of a diameter larger than and continuous with said first portion, and a shoulder between said first portion and said second portion, at least part of said second portion of said draw-bar being firmly accommodated within said second bore portion of said stepped bore over a contact area such that said shoulder engages said step in said bore, a first seal between said second portion of said draw-bar and said housing disposed within said contact area, a second seal between said second portion of said draw-bar and said second bore portion of said stepped bore in the piston, at least one nut screwed onto said first portion of the draw-bar which projects through said piston and which is accessible through said open end of said housing, said nut clamping said shoulder and said step together, and positive locating means on said free end of said draw-bar for engagement with a tool to enable said draw bar to be held against rotation at least when said nut is being tightened and untightened.

* * * * *